(12) United States Patent
Singh et al.

(10) Patent No.: US 9,985,879 B2
(45) Date of Patent: May 29, 2018

(54) APPARATUS, SYSTEM, AND METHOD FOR PREVENTING MULTICAST TRAFFIC DROPS AT EGRESS ROUTERS IN E-TREE TOPOLOGIES

(71) Applicant: Juniper Networks, Inc., Sunnyvale, CA (US)

(72) Inventors: Nitin Singh, Fremont, CA (US); Manoj Sharma, Cupertino, CA (US); Poorna Pushkala Balasubramanian, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 70 days.

(21) Appl. No.: 14/981,663

(22) Filed: Dec. 28, 2015

(65) Prior Publication Data

US 2017/0187647 A1    Jun. 29, 2017

(51) Int. Cl.
*H04L 12/753* (2013.01)
*H04L 12/931* (2013.01)
(Continued)

(52) U.S. Cl.
CPC .......... *H04L 45/48* (2013.01); *H04L 12/1886* (2013.01); *H04L 12/4625* (2013.01);
(Continued)

(58) Field of Classification Search
CPC ..... H04L 12/18; H04L 12/185; H04L 12/462; H04L 41/12; H04L 12/4645; H04L 45/04;
(Continued)

(56) References Cited

U.S. PATENT DOCUMENTS 8,270,290 B2 *   9/2012   Casey .................... H04L 45/02
                                                      370/218
8,953,590 B1 *   2/2015   Aggarwal ........... H04L 12/4675
                                                      370/389
(Continued)

FOREIGN PATENT DOCUMENTS

EP           2928114 A1    10/2015

OTHER PUBLICATIONS

Abhinav Tandon; Apparatus, System, and Method for Distributing Management Data in Multi-NMS Environments; U.S. Appl. No. 14/710,633, filed May 13, 2015.
(Continued)

*Primary Examiner* — Hassan Kizou
*Assistant Examiner* — Roberta A Shand
(74) *Attorney, Agent, or Firm* — FisherBroyles, LLP (57) ABSTRACT

The disclosed apparatus may include (1) a database that maintains a pruned multicast distribution tree and (2) a processing unit having access to the database, wherein the processing unit (A) receives at least one type 3 Ethernet Segment Identifier (ESI) message from at least one other bridge domain on at least one other computing device, (B) determines, based at least in part on the type 3 ESI message, whether the other bridge domain on the other computing device has a root access concentrator, and then (C) populates, in response to determining whether the other bridge domain has a root access concentrator, the pruned multicast distribution tree to account for the other bridge domain such that the bridge domain on the computing device is able to determine whether to send multicast traffic to the other bridge domain. Various other apparatuses, systems, and methods are also disclosed.

18 Claims, 8 Drawing Sheets

(51) Int. Cl.
  *H04L 12/18* (2006.01)
  *H04L 12/46* (2006.01)
  *H04L 12/723* (2013.01)
  *H04L 12/715* (2013.01)
  *H04L 12/823* (2013.01)

(52) U.S. Cl.
  CPC ............ *H04L 49/201* (2013.01); *H04L 45/04* (2013.01); *H04L 45/50* (2013.01); *H04L 47/32* (2013.01)

(58) Field of Classification Search
  CPC ......... H04L 45/48; H04L 47/16; H04L 45/50; H04L 45/18; H04L 49/201
  See application file for complete search history.

(56) References Cited

U.S. PATENT DOCUMENTS

| | | | |
|---|---|---|---|
| 2013/0003607 A1 | 1/2013 | Kini et al. | |
| 2015/0085640 A1* | 3/2015 | Song | H04L 12/4641 370/219 |
| 2015/0281096 A1* | 10/2015 | Boutros | H04L 47/20 370/231 |
| 2016/0277210 A1* | 9/2016 | Lin | H04L 12/4625 |

OTHER PUBLICATIONS

Sajassi, Ali et al., "E-TREE Support in EVPN & PBB-EVPN", https://tools.ietf.org/html/draft-ietf-bess-evpn-etree-03, as accessed Dec. 10, 2015, IETF, (Oct. 10, 2015).

Sajassi, A. et al., "BGP MPLS-Based Ethernet VPN", https://tools.ietf.org/html/rfc7432, as accessed Dec. 10, 2015, Request for Comments: 7432; IETF, (Feb. 2015).

"Layer 2 Bridge Domains Overview", https://www.juniper.net/techpubs/en_US/junos12.1/topics/concept/layer-2-services-bridging-overview.html, as accessed Nov. 25, 2015, TechLibrary; Juniper Networks, Inc., (on or before Nov. 25, 2015).

A. Sajassi et al., BGP MPLS-Based Ethernet VPN, IETF, http://www.rfc-editor.org/info/rfc7432, Feb. 2015.

Ali Sajassi et al., E-TREE Support in EVPN & PBB-EVPN, IETF, https://tools.ietf.org/html/draft-ietf-bels-evpn-etree-03, Oct. 10, 2015.

* cited by examiner

```
                      1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 | Type=0x06     | Sub-Type=0x04 | Flags(1 Octet)|               |
 +-+-+-+-+-+-+-+-+-+-+-+-+-+-+-+-+-+-+-+-+-+-+-+-+-+-+-+-+-+-+-+-+
 | Reserved=0    |    Leaf Label                                 |
 +-+-+-+-+-+-+-+-+-+-+-+-+-+-+-+-+-+-+-+-+-+-+-+-+-+-+-+-+-+-+-+-+
```

Message 400

APPARATUS, SYSTEM, AND METHOD FOR PREVENTING MULTICAST TRAFFIC DROPS AT EGRESS ROUTERS IN E-TREE TOPOLOGIES

INCORPORATION BY REFERENCE

This application incorporates by reference the following documents, which are concurrently filed with an Information Disclosure Statement in the U.S. Patent and Trademark Office:

The Internet Engineering Task Force (IETF) document "E-Tree Support in EVPN & PBB-EVPN" available at https://tools.ietf.org/html/draft-ietf-bess-evpn-etree-03 (accessed 10 Dec. 2015);

The IETF document "BGP MPLS-Based Ethernet VPN" available at https://tools.ietf.org/html/rfc7432 (accessed 10 Dec. 2015).

BACKGROUND

E-Tree topologies often include various Provider Edge (PE) routers that communicate with one another over a MultiProtocol Label Switching (MPLS) network. In such topologies, the PE routers may each host all or a portion of one or more bridge domains consisting of logical ports that share the same flooding and/or broadcast characteristics. Unfortunately, depending on their respective configurations, some of these bridge domains may be unable to consume certain Broadcast, unknown Unicast, and Multicast (BUM) traffic sent over the MPLS network. As a result, the egress PE routers that host such bridge domains may end up dropping that type of BUM traffic, thus leading to superfluous bandwidth and/or resource usage within the MPLS network.

As a specific example, a traditional MPLS network may have a variety of PE routers, including first and second PE routers each configured with a leaf-only bridge domain, a third PE router configured with a root-and-leaf bridge domain, and a fourth PE router configured with a root-only bridge domain. As defined in the IETF's specification document, leaf bridge domains may be able to communicate with root bridge domains but unable to communicate with one another. Accordingly, in this traditional MPLS network, the first PE router may send out a multicast communication destined for each of the second, third, and fourth PE routers. However, while the root bridge domains on the third and fourth PE routers may be able to consume the multicast communication, the leaf-only bridge domain on the second PE router may be unable to consume the multicast communication. As a result, the second PE router may simply drop the multicast communication even though the multicast communication has already travelled over the MPLS network from the first PE router to the second PE router.

The instant disclosure, therefore, identifies and addresses a need for apparatuses, systems, and methods for preventing multicast traffic drops at egress routers in E-tree topologies.

SUMMARY

As will be described in greater detail below, the instant disclosure generally relates to apparatuses, systems, and methods for preventing multicast traffic drops at egress routers in E-Tree topologies. In one example, an apparatus for accomplishing such a task may include (1) a database that maintains a pruned multicast distribution tree that identifies which bridge domains are to receive multicast traffic from a bridge domain on a computing device without dropping the multicast traffic and (2) a processing unit having access to the database, wherein the processing unit (A) receives at least one type 3 Ethernet Segment Identifier (ESI) message from at least one other bridge domain on at least one other computing device, (B) determines, based at least in part on the type 3 ESI message, whether the other bridge domain on the other computing device has a root access concentrator, and then (C) populates, in response to determining whether the other bridge domain has a root access concentrator, the pruned multicast distribution tree to account for the other bridge domain such that the bridge domain on the computing device is able to determine whether to send multicast traffic to the other bridge domain.

As another example, a router incorporating the above-described apparatus may include (1) a storage device that maintains a pruned multicast distribution tree that identifies which bridge domains are to receive BUM traffic from a bridge domain on a router and (2) a processing unit communicatively coupled to the storage device, wherein the processing unit (A) receives at least one type 3 ESI message from another bridge domain on another computing device, (B) determines, based at least in part on the type 3 ESI message, whether the other bridge domain on the other computing device has a root access concentrator, and then (C) populates, in response to determining whether the other bridge domain has a root access concentrator, the pruned multicast distribution tree to account for the other bridge domain such that the bridge domain on the computing device is able to determine whether to send BUM traffic to the other bridge domain.

As a further example, a corresponding method may include (1) maintaining a pruned multicast distribution tree that identifies which bridge domains are to receive multicast traffic from a bridge domain on a computing device, (2) receiving at least one type 3 ESI message from at least one other bridge domain on at least one other computing device, (3) determining, based at least in part on the type 3 ESI message, whether the other bridge domain on the other computing device has a root access concentrator, and then (4) populating, in response to determining whether the other bridge domain has a root access concentrator, the pruned multicast distribution tree to account for the other bridge domain such that the bridge domain on the computing device is able to determine whether to send multicast traffic to the other bridge domain.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for preventing multicast traffic drops at egress routers in E-Tree topologies. As will be explained in greater detail below, by building a pruned multicast distribution tree at each PE router within an MPLS network, embodiments of the instant disclosure may enable ingress PE routers to eliminate leaf-to-leaf multicast communications. In the event that multicast communications are initiated at ingress PE routers, embodiments of the instant disclosure may prevent any leaf-to-leaf multicast communications from being sent by ingress PE routers since (1) leaf bridge domains are unable to consume traffic originating from other leaf bridge domains and (2) egress PE routers simply drop incoming leaf-to-leaf communications. By preventing leaf-to-leaf communications from being sent by ingress PE routers in this way, embodiments of the instant disclosure may mitigate and/or reduce the amount of bandwidth and/or resources used within the MPLS network.

The term "egress," as used herein, generally refers to any type or form of computing device or component that receives a communication. The term "ingress," as used herein, generally refers to any type or form of computing device or component that sends a communication. The term "bridge domain," as used herein, generally refers to any dedicated collection, site, and/or grouping of logical interfaces and/or ports that share the same flooding and/or broadcast characteristics. The term "E-tree topology," as used herein, generally refers to any type or form of network architecture, configuration, and/or arrangement that involves and/or facilitates point-to-multipoint services and/or communications. In one example, an E-tree topology may include and/or represent an Ethernet Virtual Local Area Network (Ethernet VLAN) and/or Ethernet Virtual Private Network (EVPN) capable of facilitating BUM traffic.

Figure 1:
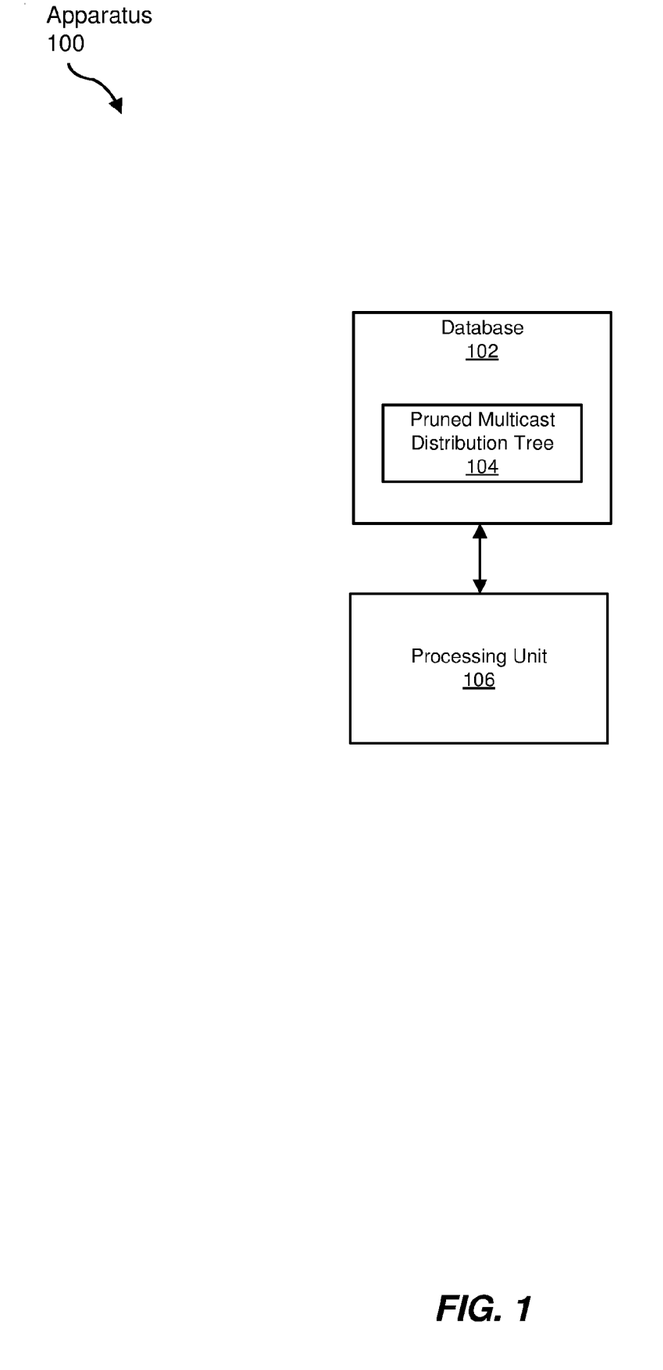
FIG. 1 is a block diagram of an exemplary apparatus for preventing multicast traffic drops at egress routers in E-Tree topologies.
Figure 5:
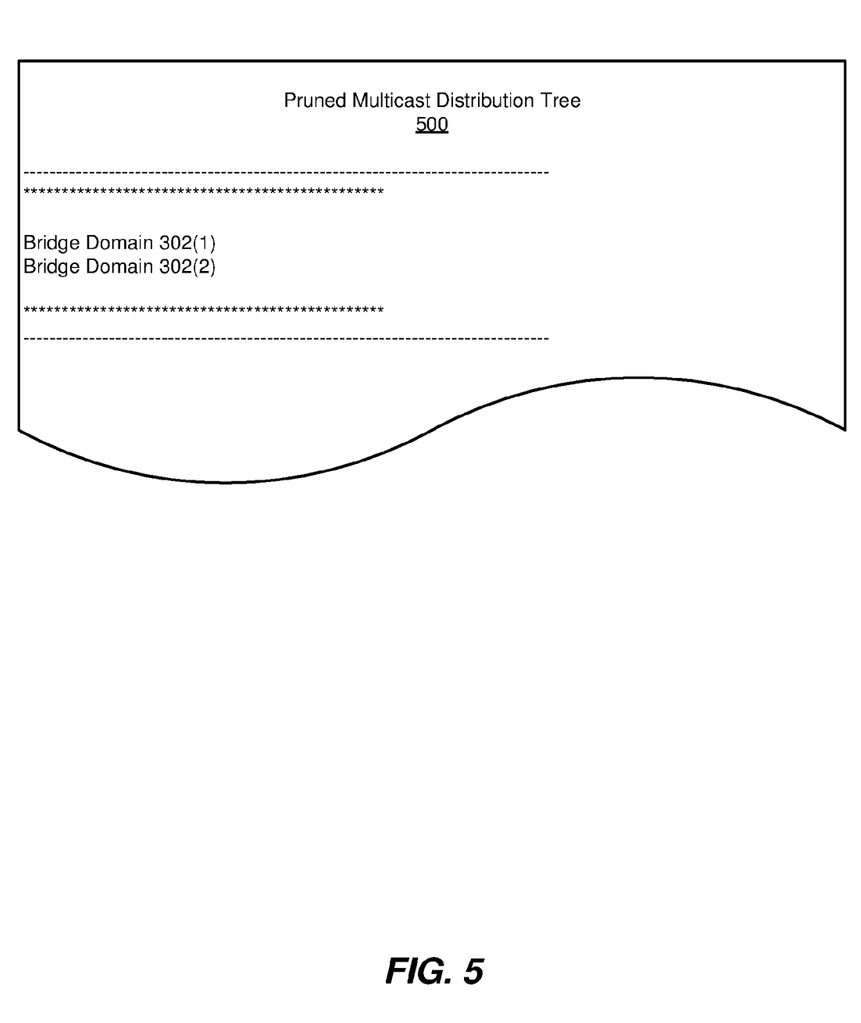
FIG. 5 is an illustration of an exemplary pruned multicast distribution tree that identifies which egress bridge domains are to receive multicast traffic from an ingress bridge domain.
Figure 6:
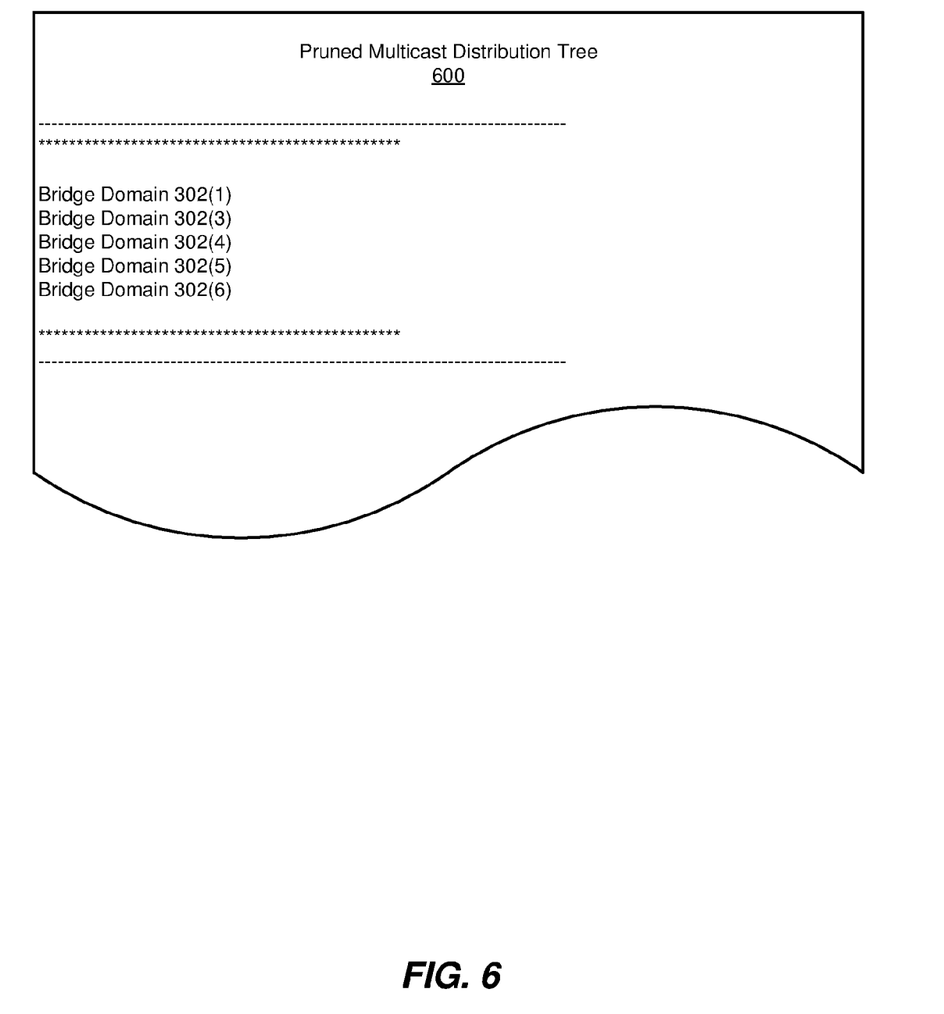
FIG. 6 is an illustration of an additional exemplary pruned multicast distribution tree that identifies which egress bridge domains are to receive multicast traffic from an ingress bridge domain.

The following will provide, with reference to FIG. 1, examples of apparatuses that prevent multicast traffic drops at egress routers in E-Tree topologies. The discussion corresponding to FIGS. 2 and 3 will provide detailed descriptions of exemplary implementations of the apparatus from FIG. 1. The discussions corresponding to FIGS. 4, 5, and 6 will provide detailed descriptions of an exemplary type 3 ESI message, an exemplary pruned multicast distribution tree, and another exemplary pruned multicast distribution tree, respectively. The discussion corresponding to FIG. 7 will provide a detailed description of an exemplary method for preventing multicast traffic drops at egress routers in E-Tree topologies. Finally, the discussion corresponding to FIG. 8 will provide numerous examples of systems that may incorporate the apparatus from FIG. 1.

FIG. 1 shows a block diagram of an exemplary apparatus 100 for preventing multicast traffic drops at egress routers in E-Tree topologies. Apparatus 100 generally represents any type or form of system, device, and/or mechanism that facilitates prevention of multicast traffic drops at egress routers in E-Tree topologies. Examples of apparatus 100 include, without limitation, network devices, routers, switches, hubs, modems, bridges, repeaters, gateways, multiplexers, network adapters, portions of one or more of the same, variations or combinations of one or more of the same, or any other suitable apparatus.

As shown in FIG. 1, apparatus 100 may include a processing unit 106 with access to and/or in communication with a database 102. The term "processing unit," as used herein, generally refers to any type or form of physical hardware, circuit, device, and/or processor that performs certain Input/Output (I/O) operations and/or computing tasks. In one example, processing unit 106 may include and/or represent an integrated circuit whose configuration and/or infrastructure is at least partially fixed. Additionally or alternatively, processing unit 106 may represent an integrated circuit whose configuration and/or infrastructure is at least partially variable and/or programmable. Examples of processing unit 106 include, without limitation, processors, microprocessors, microcontrollers, Central Processing Units (CPUs), Field-Programmable Gate Arrays (FPGAs), Application-Specific Integrated Circuits (ASICs), software modules installed one or more of the same, portions of one or more of the same, variations or combinations of one or more of the same, or any other suitable processing unit.

Database 102 generally represents any type or form of organized collection of data. In one example, database 102 may include and/or represent all or a portion of data stored on a storage device included in apparatus 100 or one or more other computing devices (not necessarily illustrated in FIG. 1). Accordingly, although database 102 is illustrated as part of apparatus 100 in FIG. 1, database 102 may alternatively include and/or represent data stored in a computing device (not necessarily illustrated in FIG. 1) in communication with apparatus 100. For example, apparatus 100 may operate as a proxy that includes an agent. In this example, the agent may manage, access, and/or modify at least a portion of database 102 maintained and/or stored on a remote computing device.

In another example, database 102 may include and/or represent all or portions of data stored across multiple storage devices included in apparatus 100 or one or more network devices (not necessarily illustrated in FIG. 1). Examples of such storage devices include, without limitation, Hard Disk Drives, (HDDs), Solid-State Drives (SSDs), flash drives, Random-Access Memory (RAM) devices, caches, virtual storage devices, variations or combinations of one or more of the same, or any other suitable storage devices.

In some examples, database 102 may be organized and/or formatted as a tree data structure. For example, at least a portion of the data stored in database 102 may be organized and/or formatted as a pruned multicast distribution tree 104. The term "multicast distribution tree," as used herein, generally refers to any type or form of tree data structure that identifies where to send multicast traffic. The term "pruned," as used herein, generally refers to a state and/or condition of a multicast distribution tree that excludes certain potential destinations and/or routes for multicast traffic.

As an example, pruned multicast distribution tree 104 may identify where a leaf bridge domain on a PE router is to send multicast traffic within an MPLS network that prohibits leaf-to-leaf communications. In this example, pruned multicast distribution tree 104 may exclude any entries that correspond to and/or represent other leaf bridge domains on other PE routers within the MPLS network since leaf-to-leaf communications are prohibited. By excluding such entries in this way, pruned multicast distribution tree 104 may enable the PE router to refrain from sending multicast communications to other PE routers that have leaf-only bridge domains.

In one example, pruned multicast distribution tree 104 may represent a forwarding table that includes entries identifying computing devices that are to receive multicast traffic from the bridge domain on apparatus 100. Additionally or alternatively, pruned multicast distribution tree 104 may represent a forwarding table that includes entries identifying all or portions of routes to computing devices that are to receive multicast traffic from the bridge domain on apparatus 100.

In some examples, processing unit 106 may be communicatively coupled to a storage device that includes database 102. In such examples, processing unit 106 may receive type 3 ESI messages from other bridge domains on computing devices within an MPLS network. These type 3 ESI messages may be communicated across computing devices within an MPLS network by way of type 3 signaling. Additionally or alternatively, these type 3 ESI messages may be carried and/or encapsulated in accordance with network layer 3 of the Internet protocol suite.

In one example, a type 3 ESI message may identify and/or indicate a Media Access Control (MAC) address of the ingress computing device. In another example, a type 3 ESI message may identify and/or indicate a router identifier that specifies the ingress computing device. Additionally or alternatively, a type 3 ESI message may identify and/or indicate an Autonomous System (AS) value that specifies the ingress computing device. Furthermore, a type 3 ESI message may be extended from those messages described in the IETF documents incorporated by reference to include certain additional information (e.g., an indicator bit).

In some examples, these type 3 ESI messages may indicate whether the ingress computing device has leaf-only bridge domains and/or any root bridge domains. For example, a type 3 ESI message may include a flag bit that is set if the ingress computing device has only a leaf bridge domain and no root bridge domains. Similarly, a type 3 ESI message may include a flag bit that is cleared if the ingress computing device has any root bridge domains (whether root-only bridge domains or a combination of root and leaf bridge domains). In either case, this bit may be included in and/or represent part of an octet dedicated to flags within the type 3 ESI message.

The term "root," as used herein, generally refers to any type or form of role and/or designation that is assigned to a bridge domain and/or an access concentrator by virtue of configuration and/or enables the bridge domain to communicate with all other types of bridge domains (such as root and/or leaf bridge domains). The term "leaf," as used herein, generally refers to any type or form of role and/or designation that is assigned to a bridge domain and/or an access concentrator by virtue of configuration and/or enables the bridge domain to communicate only with other root bridge domains and not with other leaf bridge domains. The term "access concentrator," as used herein, generally refers to any type or form of computing device that receives and/or forwards data for a network point of presence.

In some examples, a bridge domain may be considered and/or designated a root if the bridge domain has a root-only access concentrator and/or a root-and-leaf access concentrator. In contrast, a bridge domain may be considered and/or designated a leaf if the bridge domain has a leaf-only access concentrator.

In some examples, processing unit 106 may determine whether the bridge domains that sent the type 3 ESI messages have a root access concentrator. In other words, processing unit 106 may determine whether the bridge domains that sent the type 3 ESI messages have only a leaf access concentrator. For example, processing unit 106 may determine whether the bridge domains that sent the type 3 ESI messages have a root access concentrator by checking the flag bit included in the octet within the type 3 ESI message.

In the event that apparatus 100 includes a bridge domain that has a root access concentrator (whether root-only or root-and-leaf), processing unit 106 may build and/or update pruned multicast distribution tree 104 by adding and/or inserting an entry to pruned multicast distribution tree 104 for each unique type 3 ESI message. In this case, processing unit 106 may populate pruned multicast distribution tree 104 with an entry for each unique type 3 ESI message received from a computing device whose bridge domain has (1) a root-only access concentrator, (2) a leaf-only access concentrator, and/or (3) a root-and-leaf access concentrator. By populating pruned multicast distribution tree 104 in this way, processing unit 106 may account for all other bridge domains capable of consuming multicast traffic sent by the bridge domain on apparatus 100.

In contrast, in the event that apparatus 100 includes a bridge domain that has a leaf-only access concentrator, processing unit 106 may build and/or update pruned multicast distribution tree 104 by adding and/or inserting an entry to pruned multicast distribution tree 104 for each unique type 3 ESI message originating from a root bridge domain (whether root-only or root-and-leaf). In this case, processing unit 106 may populate pruned multicast distribution tree 104 with an entry for each unique type 3 ESI message received from a computing device whose bridge domain has (1) a root-only access concentrator and/or (2) a root-and-leaf access concentrator. In other words, processing unit 106 may refrain from adding and/or inserting any entries for type 3 ESI messages received from a computing device whose bridge domain has a leaf-only access concentrator. By populating pruned multicast distribution tree 104 in this way, processing unit 106 may account for all other bridge domains capable of consuming multicast traffic sent by the bridge domain on apparatus 100.

Figure 2:
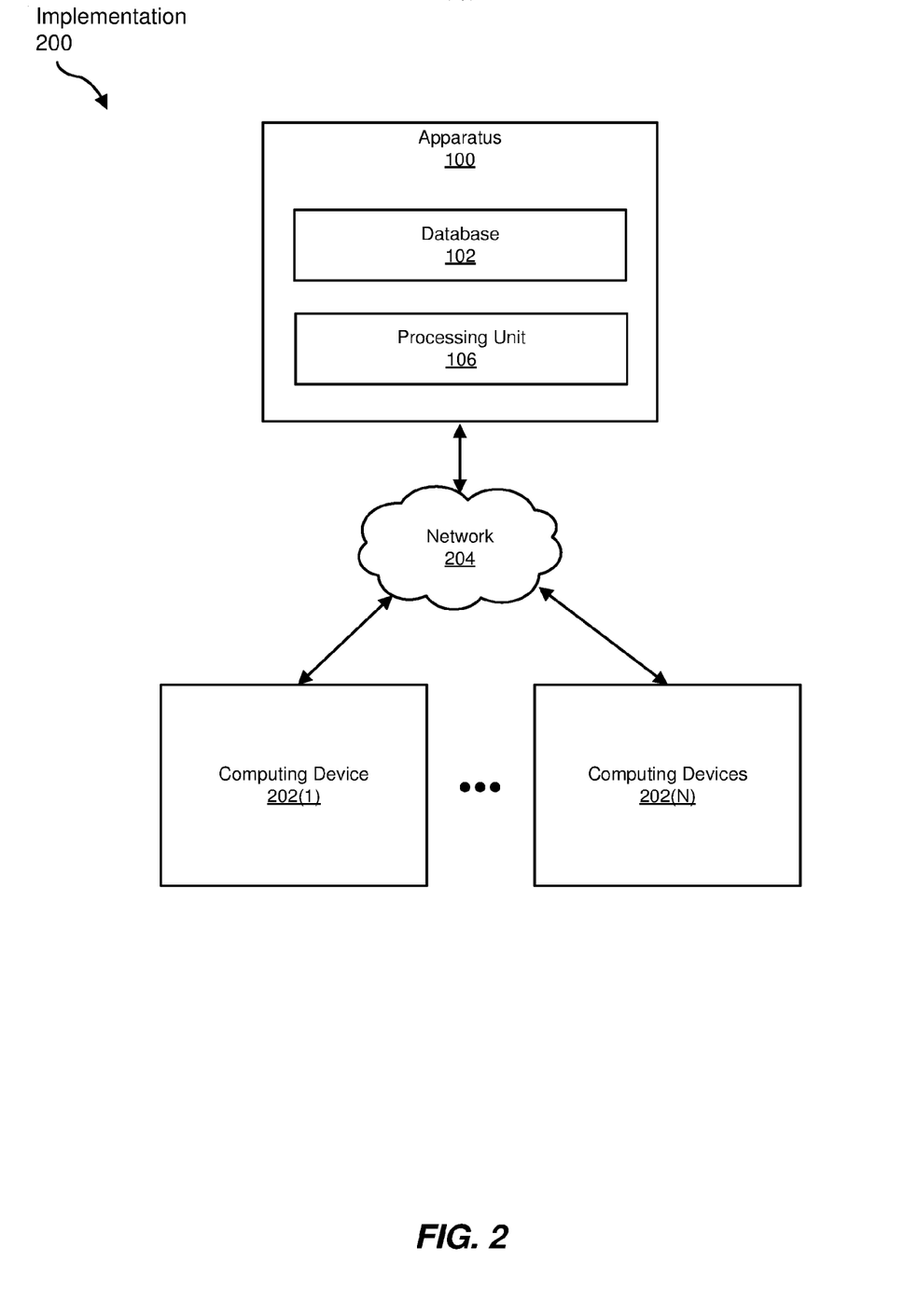
FIG. 2 is a block diagram of an exemplary implementation of an apparatus for preventing multicast traffic drops at egress routers in E-Tree topologies.

FIG. 2 shows a block diagram of an exemplary implementation 200 of apparatus 100 for preventing multicast traffic drops at egress routers in E-Tree topologies. As illustrated in FIG. 2, implementation 200 may include apparatus 100 in communication with computing devices 202(1)-(N) via a network 204. The term "network," as used herein, generally refers to any type or form of medium and/or architecture that facilitates communication or data transfer. In one example, network 204 may represent an MPLS network that includes a plurality of computing devices arranged in an EVPN E-Tree topology.

Examples of network 204 include, without limitation, an MPLS network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network. Network 204 may facilitate communication or data transfer using wireless or wired connections. Although apparatus 100 and computing devices 202(1)-(N) are illustrated as being external to network 204 in FIG. 2, apparatus 100 and/or computing devices 202(1)-(N) may alternatively represent portions of network 204 and/or be included in network 204.

The term "computing device," as used herein, generally refers to any type or form of computing device capable of reading computer-executable instructions. In some examples, computing devices 202(1)-(N) may include and/or represent PE routers that send and/or receive data packets. Examples of computing devices 202(1)-(N) include, without limitation, routers (such as PE routers), switches, modems, gateways, hubs, repeaters, servers, laptops, desktops, mobile devices, internet-enabled televisions, and/or BLU-RAY players, portions of one or more of the same, variations or combinations of one or more of the same, or any other suitable type of computing device. Computing devices 202(1)-(N) may each include a bridge domain that has an access concentrator (whether root-only, leaf-only, or root-and-leaf) that is not illustrated in FIG. 2.

In some examples, computing devices 202(1)-(N) may facilitate network traffic between multiple computing devices. For example, computing devices 202(1)-(N) may each facilitate network traffic for Internet Protocol TeleVision (IPTV) and/or Content Delivery Network (CDN) services. In this example, computing devices 202(1)-(N) may forward certain network traffic to end-point and/or destination devices that are not illustrated in FIG. 2.

In one example, apparatus 100 may build and/or maintain pruned multicast distribution tree 104 in database 102. For example, apparatus 100 may receive type 3 ESI messages from each of computing devices 202(1)-(N) via network 204. In the event that apparatus 100 includes a bridge domain that has a root access concentrator (whether root-only or root-and-leaf), processing unit 106 may build and/or update pruned multicast distribution tree 104 by adding and/or inserting an entry to pruned multicast distribution tree 104 for each of computing devices 202(1)-(N) based at least in part on the type 3 ESI messages. In this example, processing unit 106 may populate pruned multicast distribution tree 104 with an entry for each of computing devices 202(1)-(N) regardless of whether their bridge domains have (1) a root-only access concentrator, (2) a leaf-only access concentrator, and/or (3) a root-and-leaf access concentrator. By populating pruned multicast distribution tree 104 in this way, processing unit 106 may account for all bridge domains on computing devices 202(1)-(N).

In contrast, in the event that apparatus 100 includes a bridge domain that has a leaf-only access concentrator, processing unit 106 may build and/or update pruned multicast distribution tree 104 by adding and/or inserting an entry to pruned multicast distribution tree 104 for each of computing devices 202(1)-(N) that include a root bridge domain (whether root-only or root-and-leaf) based at least in part on the type 3 ESI messages. In this example, processing unit 106 may populate pruned multicast distribution tree 104 with an entry for each of computing devices 202(1)-(N) that include a root bridge domain. Accordingly, processing unit 106 may refrain from adding and/or inserting an entry for any of computing devices 202(1)-(N) whose bridge domain has a leaf-only access concentrator due at least in part to the prohibition on leaf-to-leaf communications. By populating pruned multicast distribution tree 104 in this way, processing unit 106 may account for all other bridge domains capable of consuming multicast traffic sent by the bridge domain on apparatus 100.

In one example, processing unit 106 may detect an attempt to multicast a communication to certain bridge domains across network 204. For example, processing unit 106 may detect a request to send a multicast communication to computing devices 202(1)-(N) whose bridge domains are represented by entries included in pruned multicast distribution tree 104. In this example, processing unit 106 may identify which bridge domains on computing devices 202(1)-(N) are to receive multicast traffic from apparatus 100 via network 204 based at least in part on pruned multicast distribution tree 104. Processing unit 106 may then send a multicast communication to the identified bridge domains via network 204.

As explained above, in the event that apparatus 100 includes a bridge domain that has a leaf-only access concentrator, pruned multicast distribution tree 104 may exclude leaf bridge domains on computing devices 202(1)-(N) due at least in part to the prohibition on leaf-to-leaf communications. As a result, processing unit 106 may refrain from sending the multicast communication to those bridge domains that have leaf-only access concentrators on computing devices 202(1)-(N). In other words, processing unit 106 may prevent the multicast communication from being sent by apparatus 100 to any computing device whose bridge domain has a leaf-only access concentrator due at least in part to that bridge domain's inability to consume leaf-to-leaf communications.

Figure 3:
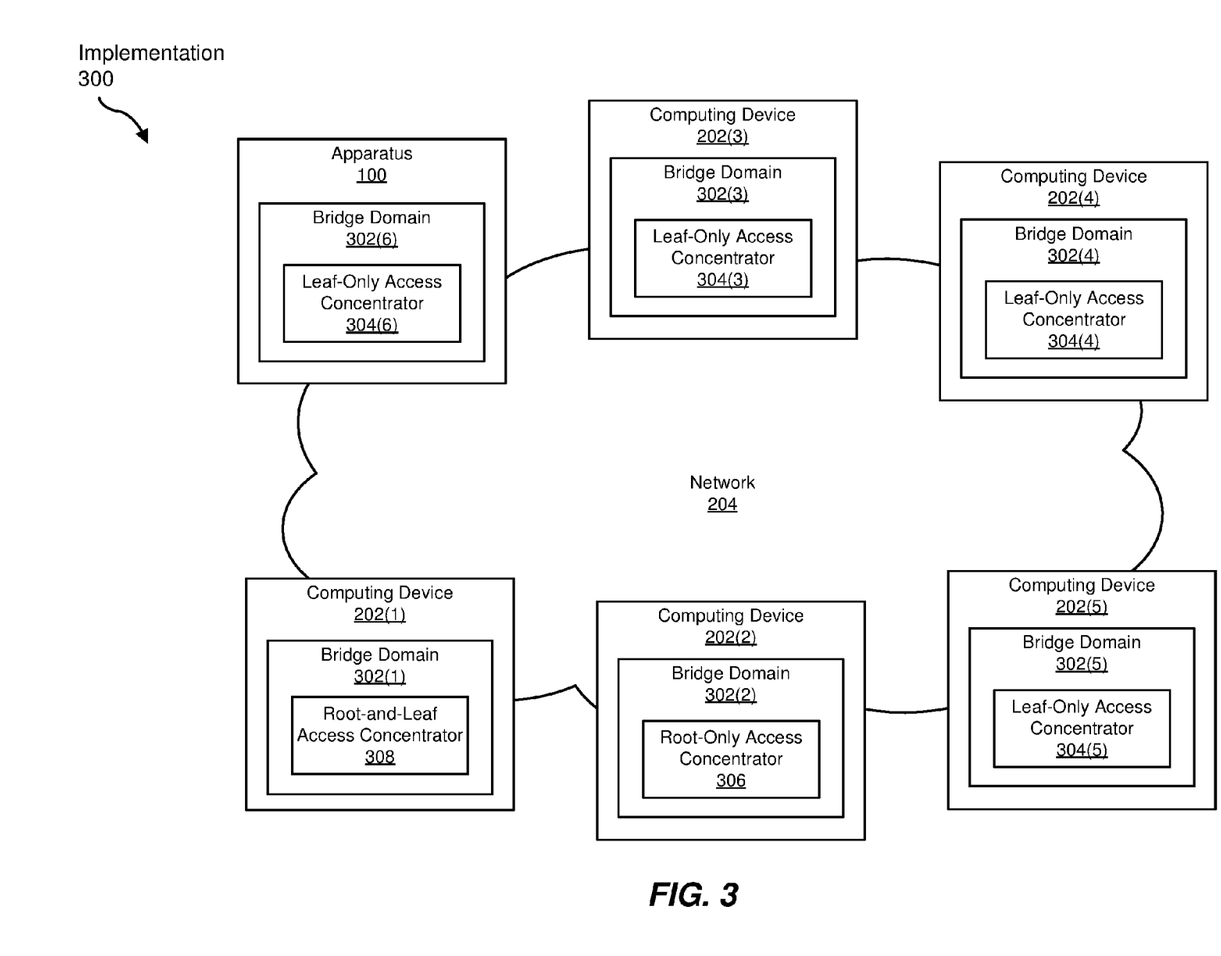
FIG. 3 is a block diagram of an additional exemplary implementation of an apparatus for preventing multicast traffic drops at egress routers in E-Tree topologies.

FIG. 3 shows an additional exemplary implementation 300 for preventing multicast traffic drops at egress routers in E-Tree topologies. As illustrated in FIG. 3, implementation 300 may include a network 204 that facilities communication among apparatus 100 and computing devices 202(1), 202(2), 202(3), 202(4), and 202(5). In this example, apparatus 100 may include a bridge domain 302(6) that has a leaf-only access concentrator 304(6), and computing device 202(1) may include a bridge domain 302(1) that has a root-and-leaf access concentrator 308. In addition, computing device 202(2) may include a bridge domain 302(2) that has a root-only access concentrator 306, and computing device 202(3) may include a bridge domain 302(3) that has a leaf-only access concentrator 304(3). Finally, computing device 202(4) may include a bridge domain 302(4) that has a leaf-only access concentrator 304(4), and computing device 202(5) may include a bridge domain 302(5) that has a leaf-only access concentrator 304(5).

Figure 4:
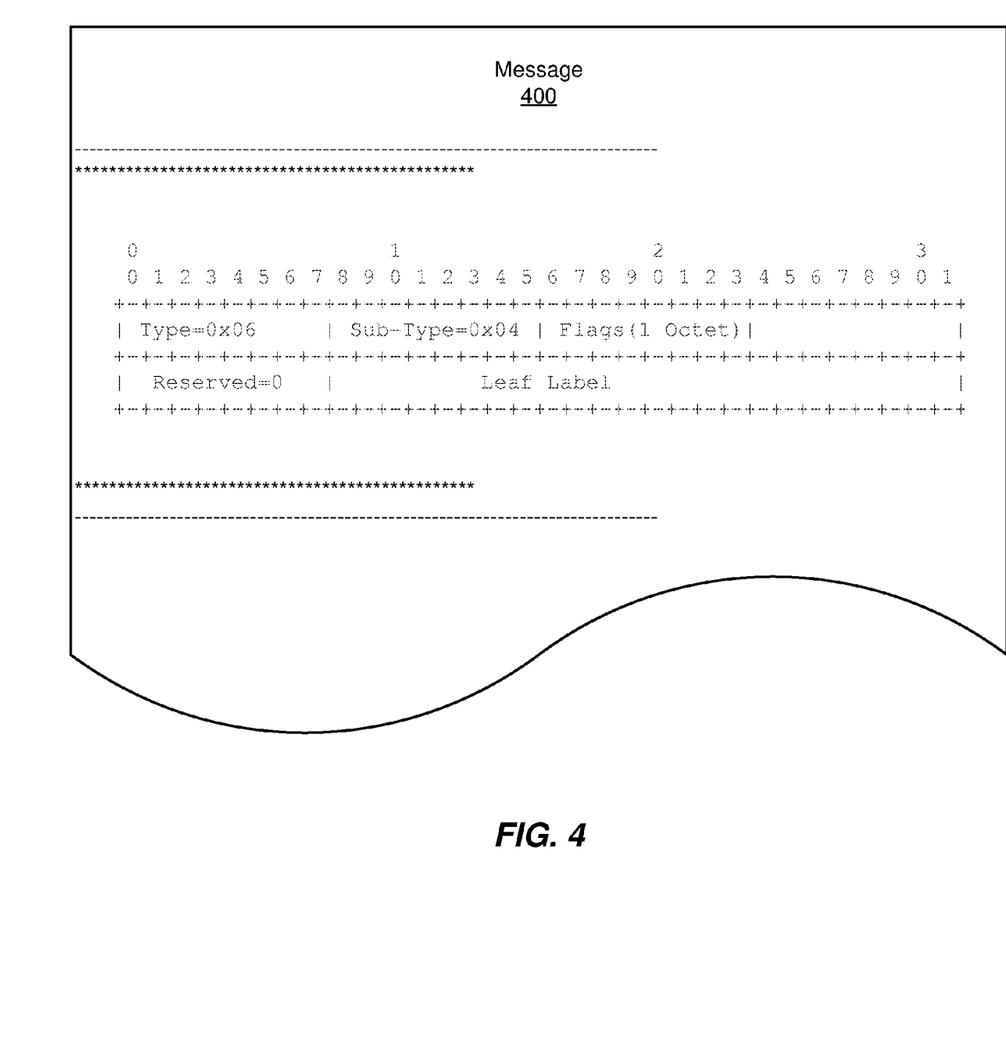
FIG. 4 is an illustration of an exemplary message that indicates whether a bridge domain on a computing device has a root access concentrator.

Continuing with this example, apparatus 100 and computing devices 202(1), 202(2), 202(3), 202(4), and 202(5) may send type 3 ESI messages to one another to facilitate building pruned multicast distribution trees. For example, computing device 202(5) may send a message 400 in FIG. 4 to each of apparatus 100 and computing devices 202(1)-(4) via network 204. As illustrated in FIG. 4, message 400 may include an octet dedicated to flags. In this example, one bit within the flags octet may be set to indicate that bridge domain 302(5) on computing device 202(5) has a leaf-only access concentrator.

From these type 3 ESI messages, apparatus 100 and computing devices 202(1), 202(2), 202(3), 202(4), and 202 (5) may each build and/or maintain a pruned multicast distribution tree that identifies where to send BUM traffic. For example, apparatus 100 may build a pruned multicast distribution tree 500 in FIG. 5 that includes and/or identifies only bridge domains 302(1) and 302(2) since bridge domains 302(3)-(5) are unable to consume leaf-to-leaf communications. In this example, computing device 202(2) may build a pruned multicast distribution tree 600 in FIG. 6 that includes and/or identifies bridge domains 302(1) and 302 (3)-(6) since all of these bridge domains are able to consume multicast communications originating from a bridge domain with a root access concentrator.

Continuing with this example, apparatus 100 may, in accordance with its pruned multicast distribution tree, send BUM traffic to computing devices 202(1) and 202(2). In addition, computing device 202(1) may, in accordance with its pruned multicast distribution tree, send BUM traffic to apparatus 100 and computing devices 202(2)-(5). Computing device 202(2) may, in accordance with its pruned multicast distribution tree, send BUM traffic to apparatus 100 and computing devices 202(1) and 202(3)-(5). Computing device 202(3) may, in accordance with its pruned multicast distribution tree, send BUM traffic to computing devices 202(1) and 202(2). Computing device 202(4) may, in accordance with its pruned multicast distribution tree, send BUM traffic to computing devices 202(1) and 202(2). Finally, computing device 202(5) may, in accordance with its pruned multicast distribution tree, send BUM traffic to computing devices 202(1) and 202(2).

As explained above, by building a pruned multicast distribution tree at each computing device within a network 204, these computing devices may eliminate leaf-to-leaf multicast communications. Upon initiating multicast communications, these computing devices may prevent any leaf-to-leaf multicast communications from being sent since (1) leaf bridge domains are unable to consume traffic originating from other leaf bridge domains and (2) egress computing devices simply drop incoming leaf-to-leaf communications. By preventing any leaf-to-leaf communications from ever being sent in this way, these computing devices may mitigate and/or reduce the amount of bandwidth and/or resources used within network 204.

Figure 7:
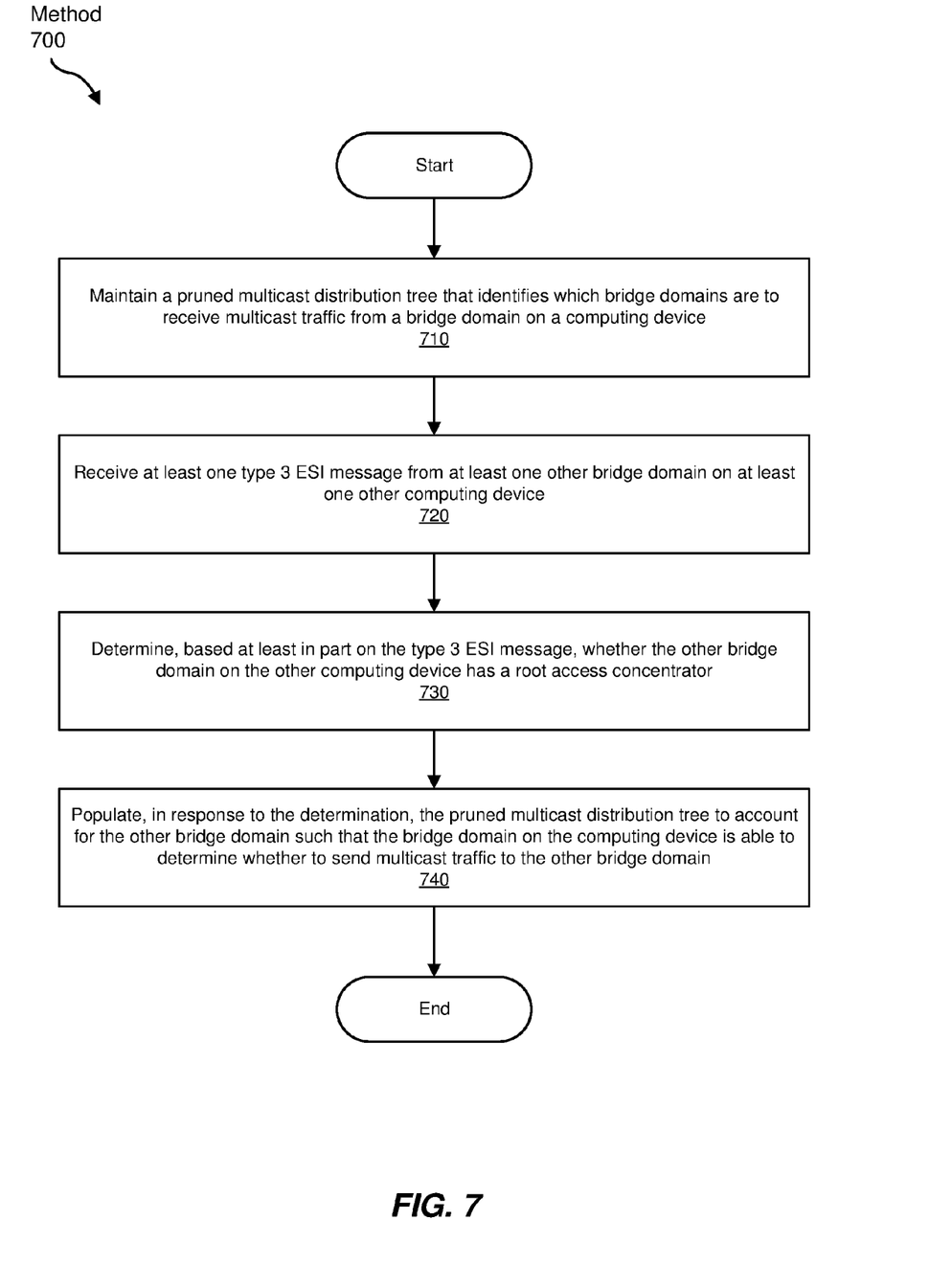
FIG. 7 is a flow diagram of an exemplary method for preventing multicast traffic drops at egress routers in E-Tree topologies.

FIG. 7 is a flow diagram of an exemplary method 700 for preventing multicast traffic drops at egress routers in E-Tree topologies. Method 700 may include the step of maintaining a pruned multicast distribution tree that identifies which bridge domains are to receive multicast traffic from a bridge domain operating on a computing device (710). This maintaining step may be performed in a variety of ways. For example, processing unit 106 may, as part of a PE router included in an MPLS network, build and/or create a pruned multicast distribution tree that identifies where to send multicast traffic across the MPLS network. Additionally or alternatively, processing unit 106 may update the pruned multicast distribution tree to account for any changes to the configuration of the MPLS network.

In one example, this maintaining step may involve and/or incorporate one or more of the receiving, determining, and populating steps described below. In other words, processing unit 106 may be able to carry out and/or achieve this maintaining step by performing one or more of the receiving, determining, and populating steps described below.

Returning to FIG. 7, method 700 may also include the step of receiving at least one type 3 ESI message from at least one other bridge domain on at least one other computing device (720). This receiving step may be performed in a variety of ways. For example, processing unit 106 may, as part of the PE router included in the MPLS network, receive a type 3 ESI message indicating that another PE router includes a bridge domain that has a root-only or root-and-leaf access concentrator. In this example, processing unit 106 may receive a type 3 ESI message indicating that a further PE router includes a bridge domain that has a leaf-only access concentrator.

Returning to FIG. 7, method 700 may additionally include the step of determining, based at least in part on the type 3 ESI message, whether the other bridge domain on the other computing device has a root access concentrator (730). This determining step may be performed in a variety of ways. For example, processing unit 106 may, as part of the PE router included in the MPLS network, determine whether the other PE router and/or the further PE router includes a bridge domain that has a root access concentrator based at least in part on the type 3 ESI messages.

Returning to FIG. 7, method 700 may further include the step of populating, in response to the determination, the pruned multicast distribution tree to account for the other bridge domain such that the bridge domain on the computing device is able to determine whether to send multicast traffic to the other bridge domain on the other computing device (740). This populating step may be performed in a variety of ways. For example, processing unit 106 may, as part of the PE router included in the MPLS network, populate the pruned multicast distribution tree for the PE router to account for the bridge domains on the other PE router and the further PE router.

In one example, the PE router may add and/or insert an entry that represents the bridge domain on the other PE router to the pruned multicast distribution tree. Additionally or alternatively, in the event that the PE router includes a bridge domain with a leaf-only access concentrator, the PE router may exclude any entries that correspond to and/or represent the bridge domains on the further PE router since leaf-to-leaf communications are prohibited.

Figure 8:
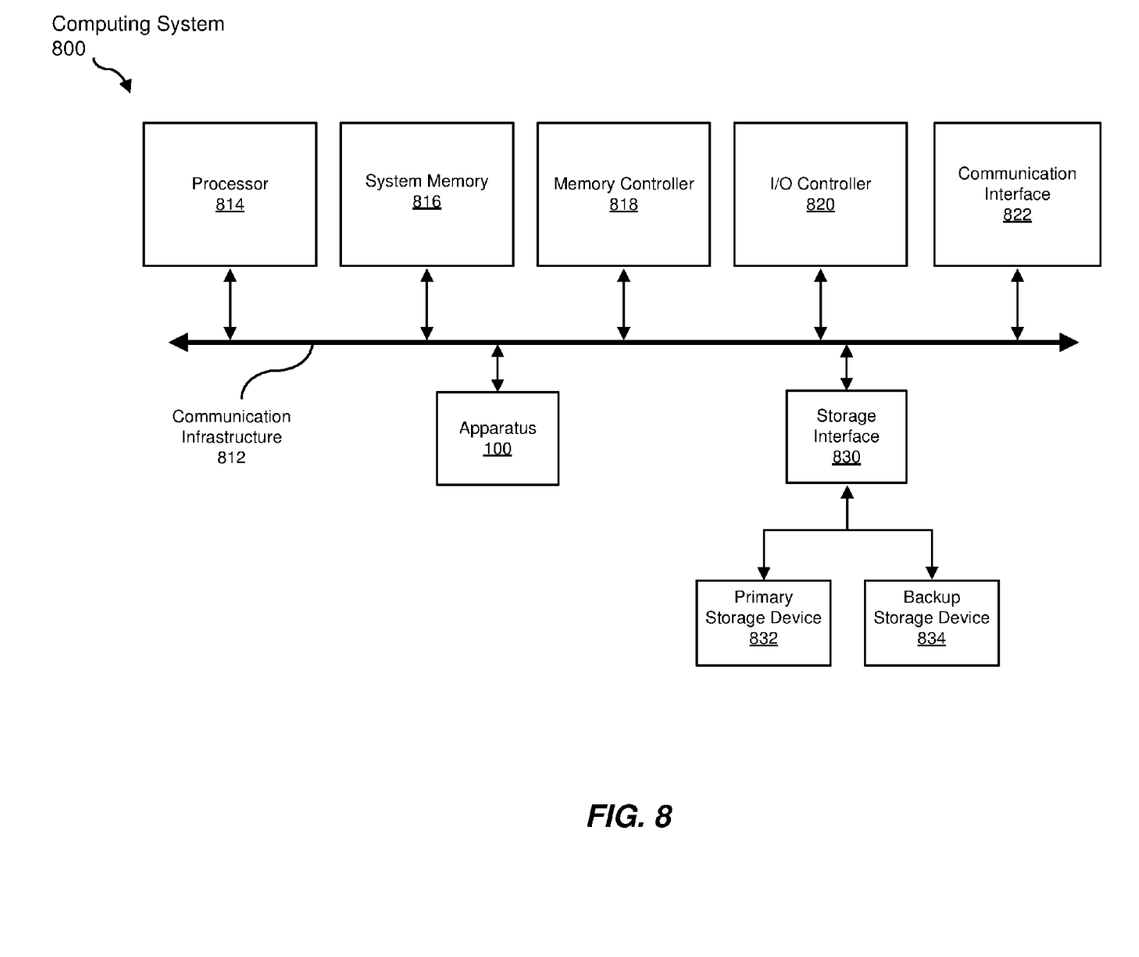
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 7. All or a portion of computing system 800 may also perform and/or be a means for performing and/or implementing any other steps, methods, or processes described and/or illustrated herein. In one example, computing system 800 may include apparatus 100 from FIG. 1.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a leaf-only access concentrator;
    a database that maintains a pruned multicast distribution tree that identifies which bridge domains are to receive multicast traffic from a bridge domain on a computing device without dropping the multicast traffic; and
    a physical processing device having access to the database, wherein the physical processing device:
        receives at least one type 3 Ethernet Segment Identifier (ESI) message from at least one other bridge domain on at least one other computing device;
        determines, based at least in part on the type 3 ESI message received from the other bridge domain, that the other bridge domain on the other computing device has a root access concentrator;
        populates, in response to determining that the other bridge domain has a root access concentrator, the pruned multicast distribution tree to account for the other bridge domain such that the bridge domain on the computing device is able to send multicast traffic to the other bridge domain;
receives at least one additional type 3 ESI message from at least one additional bridge domain on at least one additional computing device;
determines, based at least in part on the type 3 ESI message received from the additional bridge domain, that the additional bridge domain on the additional computing device does not have a root access concentrator; and
refrains from inserting, in response to determining that the additional bridge domain on the additional computing device does not have a root access concentrator, an entry indicating that the bridge domain is to send multicast traffic to the additional bridge domain.

2. The apparatus of claim 1, wherein the physical processing device:
inserts, within the pruned multicast distribution tree in response to determining that the other bridge domain has the root access concentrator, an entry indicating that the bridge domain is to send multicast traffic to the other bridge domain.

3. The apparatus of claim 1, wherein the physical processing device determines that the additional bridge domain does not have a root access concentrator by determining that the additional bridge domain has only a leaf access concentrator.

4. The apparatus of claim 1, wherein:
the type 3 ESI message includes a bit within an octet dedicated to flags; and
the physical processing device determines, based at least in part on the bit within the octet, that the other bridge domain on the other computing device has a root access concentrator.

5. The apparatus of claim 1, wherein the physical processing device:
detects an attempt to multicast a communication to certain bridge domains across a MultiProtocol Label Switching (MPLS) network;
identifies, based at least in part on the pruned multicast distribution tree, which bridge domains are to receive the multicast communication across the MPLS network; and
upon identifying which bridge domains are to receive the multicast communication, sending the multicast communication to the identified bridge domains across the MPLS network.

6. The apparatus of claim 5, wherein:
the bridge domain on the computing device does not have a root access concentrator;
the pruned multicast distribution tree excludes at least one further bridge domain that does not have a root access concentrator; and
the physical processing device refrains from sending the multicast communication to the further bridge domain due at least in part to neither of the bridge domain and the further bridge domain having a root access concentrator.

7. The apparatus of claim 6, wherein the physical processing device prevents the multicast communication from being sent to the further bridge domain due at least in part to the further bridge domain being unable to consume any multicast traffic originating from a bridge domain that does not have a root access concentrator.

8. The apparatus of claim 1, wherein the bridge domains that are to receive multicast traffic from the bridge domain on the computing device comprise bridge domains that are able to consume the multicast traffic received from the bridge domain on the computing device.

9. The apparatus of claim 1, wherein the multicast traffic comprises Broadcast, unknown Unicast, and Multicast (BUM) traffic.

10. A router comprising:
a leaf-only access concentrator;
a storage device that maintains a pruned multicast distribution tree that identifies which bridge domains are to receive Broadcast, unknown Unicast, and Multicast (BUM) traffic from a bridge domain on the router; and
a physical processing device communicatively coupled to the storage device, wherein the physical processing device:
receives at least one type 3 Ethernet Segment Identifier (ESI) message from another bridge domain on another router;
determines, based at least in part on the type 3 ESI message received from the other bridge domain, that the other bridge domain on the other router has a root access concentrator;
populates, in response to determining that the other bridge domain has a root access concentrator, the pruned multicast distribution tree to account for the other bridge domain such that the bridge domain on the router is able to send BUM traffic to the other bridge domain;
receives at least one additional type 3 ESI message from at least one additional bridge domain on at least one additional computing device;
determines, based at least in part on the type 3 ESI message received from the additional bridge domain, that the additional bridge domain on the additional computing device does not have a root access concentrator; and
refrains from inserting, in response to determining that the additional bridge domain on the additional computing device does not have a root access concentrator, an entry indicating that the bridge domain is to send BUM traffic to the additional bridge domain.

11. The router of claim 10, wherein the physical processing device:
inserts, within the pruned multicast distribution tree in response to determining that the other bridge domain has the root access concentrator, an entry indicating that the bridge domain is to send BUM traffic to the other bridge domain.

12. The router of claim 10, wherein the physical processing device unit determines that the additional bridge domain does not have a root access concentrator by determining that the additional bridge domain has only a leaf access concentrator.

13. The router of claim 10, wherein:
the type 3 ESI message includes a bit within an octet dedicated to flags; and
the physical processing device determines, based at least in part on the bit within the octet, that the other bridge domain on the other router has a root access concentrator.

14. The router of claim 10, wherein the physical processing device:
detects an attempt to multicast a communication to certain bridge domains across a MultiProtocol Label Switching (MPLS) network;

identifies, based at least in part on the pruned multicast distribution tree, which bridge domains are to receive the multicast communication across the MPLS network; and upon identifying which bridge domains are to receive the multicast communication, sending the multicast communication to the identified bridge domains across the MPLS network.

15. The router of claim 14, wherein:
the bridge domain on the router does not have a root access concentrator;
the pruned multicast distribution tree excludes at least one further bridge domain that does have a root access concentrator; and
wherein the physical processing device unit refrains from sending the multicast communication to the further bridge domain due at least in part to neither of the bridge domain and the further bridge domain having a root access concentrator.

16. The router of claim 15, wherein the physical processing device prevents the multicast communication from being sent to the additional bridge domain due at least in part to the additional bridge domain being unable to consume any BUM traffic originating from a bridge domain that does not have a root access concentrator.

17. A method comprising:
maintaining a pruned multicast distribution tree that identifies which bridge domains are to receive multicast traffic from a bridge domain on a computing device that has a leaf-only access concentrator;

receiving at least one type 3 Ethernet Segment Identifier (ESI) message from at least one other bridge domain on at least one other computing device;
determining, based at least in part on the type 3 ESI message, that the other bridge domain on the other computing device has a root access concentrator;
populating, in response to determining that the other bridge domain has a root access concentrator, the pruned multicast distribution tree to account for the other bridge domain such that the bridge domain on the computing device is able to determine whether to send multicast traffic to the other bridge domain;
receiving at least one additional type 3 ESI message from at least one additional bridge domain on at least one additional computing device;
determining, based at least in part on the type 3 ESI message, that the additional bridge domain on the additional computing device does not have a root access concentrator; and
refraining from inserting, in response to determining that the additional bridge domain on the additional computing device does not have a root access concentrator, an entry indicating that the bridge domain is to send multicast traffic to the additional bridge domain.

18. The method of claim 17, wherein maintaining the pruned multicast distribution tree comprises building the pruned multicast distribution tree by populating the pruned multicast distribution tree with entries that indicate which bridge domains are able to receive multicast traffic without dropping the multicast traffic.

* * * * *

UNITED STATES PATENT AND TRADEMARK OFFICE
CERTIFICATE OF CORRECTION

PATENT NO. : 9,985,879 B2  
APPLICATION NO. : 14/981663  
DATED : May 29, 2018  
INVENTOR(S) : Singh et al.

Page 1 of 1

It is certified that error appears in the above-identified patent and that said Letters Patent is hereby corrected as shown below:

In the Claims

Column 16, Line 52, Claim 12, delete "device unit determines" and insert -- device determines --, therefor.

Column 17, Line 16, Claim 15, delete "device unit refrains" and insert -- device refrains --, therefor.

Signed and Sealed this
Second Day of October, 2018

Andrei Iancu
*Director of the United States Patent and Trademark Office*